US012491738B2

(12) United States Patent
Fontaine et al.

(10) Patent No.: US 12,491,738 B2
(45) Date of Patent: Dec. 9, 2025

(54) TIRE WITH VARIABLE NUMBER OF LATERAL BLOCKS PER PITCH

(71) Applicant: The Goodyear Tire & Rubber Company, Akron, OH (US)

(72) Inventors: Sebastien Willy Fontaine, Vichten (LU); Thomas Charles Pierre Roland, Luxembourg (LU); Armand René Gabriel Leconte, Insenborn (LU); Frederic Ngo, Mersch (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 18/463,530

(22) Filed: Sep. 8, 2023

(65) Prior Publication Data

US 2024/0092125 A1    Mar. 21, 2024

Related U.S. Application Data

(60) Provisional application No. 63/375,796, filed on Sep. 15, 2022.

(51) Int. Cl.
*B60C 11/11* (2006.01)
*B60C 11/03* (2006.01)

(52) U.S. Cl.
CPC ........... *B60C 11/0302* (2013.01); *B60C 11/11* (2013.01); *B60C 2011/0358* (2013.01); *B60C 2011/0362* (2013.01)

(58) Field of Classification Search
CPC .................................................. B60C 11/0302
See application file for complete search history.

(56) References Cited

U.S. PATENT DOCUMENTS

| 4,667,718 A * | 5/1987 | Fontaine ................. B60C 11/11 |
| | | 152/902 |
| 5,360,043 A | 11/1994 | Croyle et al. |
| 2018/0297414 A1* | 10/2018 | Tahara ................ B60C 11/0304 |

FOREIGN PATENT DOCUMENTS

| DE | 2128873 A1 * | 12/1972 | |
| DE | 19548733 A1 * | 6/1997 | ......... B60C 11/0302 |
| DE | 10145061 A1 | 4/2003 | |

(Continued)

OTHER PUBLICATIONS

English machine translation of DE10311430 (Year: 2004).*

(Continued)

*Primary Examiner* — Robert C Dye
(74) *Attorney, Agent, or Firm* — Eryn Ace Fuhrer; June E. Rickey

(57) ABSTRACT

The present invention provides a tire for a vehicle comprising: a rotation axis, a midplane at a central position along the rotation axis; a circumferential tread portion around the rotation axis, the circumferential tread portion comprising: a tread pattern exhibiting at least a first pitch pattern and a second pitch pattern each comprising: a center block crossed by the midplane, and two side block alignments, said side block alignments being inclined with respect to one another and extending from the center block; the first pitch pattern including: a first pitch length, a first number of blocks; the second pitch pattern including: a second pitch length which is shorter than the first pitch length, and a third number of blocks which is greater than the first number of blocks.

8 Claims, 5 Drawing Sheets

(56) References Cited

FOREIGN PATENT DOCUMENTS

| | | | | |
|---|---|---|---|---|
| DE | 10311430 A1 | * | 9/2004 | ......... B60C 11/0302 |
| EP | 2965925 A1 | | 1/2016 | |
| FR | 2452391 A1 | * | 10/1980 | |
| JP | H09300917 A | | 11/1997 | |
| WO | 2019001789 A1 | | 1/2019 | |

OTHER PUBLICATIONS

English machine translation of DE19548733 (Year: 1997).*
English machine translation of FR-2452391-A1 (Year: 1980).*
English machine translation of DE2128873 (Year: 1972).*
European Search Report for Serial No. EP23197445 mailed Dec. 18, 2023.

* cited by examiner

TIRE WITH VARIABLE NUMBER OF LATERAL BLOCKS PER PITCH

FIELD OF THE INVENTION

The present invention provides a tire with a tread band having a specific design. More precisely, the invention is about a pneumatic tire or a non-pneumatic tire comprising a tread design with a variable pitch.

BACKGROUND OF THE INVENTION

Tire noise is a phenomenon occurring when a vehicle travels along a road surface. Noise is generated primarily by the interaction of the tire tread with the road surface depending on the vehicle speed, the road roughness and tread design. The amount of noise can differ greatly from one tread pattern to another depending upon geometric features related to the tread pattern.

One well-known means in the industry to reduce objectionable tire noise is to spread the noise over a wide frequency spectrum. This result is achieved by varying the circumferential pitch length of the repetitive tread pattern design elements around the tire. For example, it is common to have at least three different pitch lengths for the block elements, and also to mix the differing pitch lengths of block elements in a non-uniform manner. Moreover, the tread pattern is commonly designed in order to optimise grip on different ground surfaces such as concrete roads and off-road tracks.

The document U.S. Pat. No. 4,667,718A provides a pneumatic tire for a passenger car which comprises a ground contacting tread portion. The tread portion consists of a plurality of independent block elements of substantially the same geometric shape but differing in size. There are three different size of elements which are arranged in rows. Furthermore, the rows have differing numbers of block elements therein and each row consists of block elements that are substantially identical and that have the same axial width and circumferential length. The circumferential lengths for the block elements respectively are such that for any given row the multiple of the circumferential length of the block elements in that row times the number of block elements in the respective row is substantially constant.

In one embodiment, the tread portion extending between two lateral edges includes two pluralities of block elements, a first plurality of block elements arranged in rows on one side of the mid circumferential plane, and a second plurality of block elements arranged on the other side of the mid circumferential plane. The first plurality of block elements is identical in that it mirrors images of the second plurality of block elements. The rows of the first plurality of block elements meet with the rows of the second plurality of block elements at the mid-circumferential plane.

The document EP0479761A2 teaches a pneumatic vehicle tire of radial design with a tread profile that is bound in the direction of rotation. The tread profile exhibits profile elements separated from one another by transverse grooves and by circumferential grooves that run in particular in a straight line. The transverse grooves and the profile elements form profile sections of the same type in the circumferential direction. Three different pitch lengths L1, L2 and L3 are provided. Starting from a tread edge, the pitch lengths change continuously up to the center line M-M, so that reference pitch lengths L1', L2' and L3' exist along the center line M-M, with L3'<L3, L2'>L2 and L1'>L1. The pitch with the length L1, the associated reference pitch length L1' should be at most 30% shorter than L1 or be at most 50% longer than L1. However, their tire noise may still be reduced.

It is an objective of the present invention to improve or solve at least one drawback of the prior art. It is another objective of the present invention to reduce the noise generation of a tire. It is a further objective of the present invention to improve the balance of properties of a tire including the reduction of noise generation and the grip on the road surface. It is a further objective of the present disclosure to optimize the noise reduction, the tire traction and the offroad capabilities.

SUMMARY OF THE INVENTION

According to a first aspect, the invention provides a tire for a vehicle, the tire comprising a rotation axis, a midplane at a central position along the rotation axis; and a circumferential tread portion around the rotation axis, the circumferential tread portion comprising a tread pattern exhibiting at least a first pitch pattern and a second pitch pattern, each comprising a center block crossed by the midplane, and two side block alignments which are inclined with respect to one another and extending from the center block; the first pitch pattern including a first pitch length and a first number of blocks; the second pitch pattern including a second pitch length which is shorter than the first pitch length, and a second number of blocks which is greater than the first number of blocks.

According to a second aspect, the invention provides a tire for a vehicle, the tire comprising: a rotation axis, a midplane at a central position along the rotation axis; and a circumferential tread portion around the rotation axis comprising a tread pattern exhibiting at least a first pitch pattern and a second pitch pattern; the first pitch pattern including a first group of identical blocks comprising: a first center block, two side block alignments which are inclined with respect to one another; and a first number of identical blocks; the second pitch pattern including a second group of identical blocks, comprising a second center block adjacent to the first center block, and two side block alignments being inclined with respect to one another; and a second number of identical blocks which is greater than the first number.

According to a third aspect, the invention provides a tire for a vehicle, the tire comprising a rotation axis, a midplane at a central position along the rotation axis; and a circumferential tread portion around the rotation axis, the circumferential tread portion comprising a tread pattern exhibiting at least a first pitch pattern and a second pitch pattern, each comprising a center block at the midplane, and two side block alignments inclined with respect to one another and extending from the center block; the first pitch pattern including a first pitch length and a first number of blocks; the second pitch pattern including: a second pitch length which is shorter than the first pitch length, a second number of blocks which is different from the first number of blocks; and the tread pattern comprising a first groove between the first pitch pattern and the second pitch pattern; the first pitch pattern comprising second grooves between the blocks; said first groove being deeper than the second grooves.

According to a fourth aspect, the invention provides a tire for a vehicle, the tire comprising a rotation axis, a midplane at a central position along the rotation axis; and a circumferential tread portion around the rotation axis, the circumferential tread portion comprising: a tread pattern exhibiting at least a first pitch pattern and a second pitch pattern each comprising: a center block crossed by the midplane, two side block alignments inclined with respect to one another and extending from the center block; the first pitch pattern including a first pitch length, the second pitch pattern including a second pitch length which is shorter than the first pitch length, the tread pattern comprising a first groove between the first pitch pattern and the second pitch pattern; the first pitch pattern comprising second grooves between the blocks; said second grooves being narrower than the first groove and/or the second groove comprising different widths.

The following can be used to further define the tire according to the first, the second, the third, and the fourth aspect of the present invention.

For example, the tire is a pneumatic tire or a non-pneumatic tire; with preference, the tire is a pneumatic tire.

In an embodiment, the blocks have a geometrical shape selected from a quadrilateral shape, a triangular shape or a circular shape. For example, the blocks have a quadrilateral shape selected from a square shape, a trapezoidal shape, a diamond shape or a rectangular shape.

For example, the blocks have a quadrilateral shape with a main axis parallel to the rotation axis; and/or the blocks have a quadrilateral shape wherein the first pitch pattern includes a first pitch width, and the second pitch pattern includes a second pitch width which is shorter than the first pitch width.

For example, the blocks have a square shape and the first pitch pattern includes a first pitch width, and the second pitch pattern includes a second pitch width which is shorter than the first pitch width. For example, the blocks have a square shape with a diagonal parallel to the rotation axis, the first pitch pattern includes a first pitch width; and the second pitch pattern includes a second pitch width which is shorter than the first pitch width.

In an embodiment, the blocks of the first pitch pattern are first identical blocks, and the blocks of the second pitch pattern are second identical blocks which have a different size than the first identical blocks, and the second identical blocks and the first identical blocks comprise a same geometrical shape.

In an embodiment, the first pitch pattern and the second pitch pattern are circumferentially separated by a first groove including a first constant depth, and within the first pitch pattern, the blocks are separated by second grooves including a second depth which is shallower than the first constant depth.

With preference, the first groove comprises a first section and a second section which is inclined with respect to the first section, at least one of the second grooves being aligned on the first section.

Preferably, the first pitch pattern and the second pitch pattern are circumferentially separated by a first groove including a first width, and within the first pitch pattern, the blocks are separated by second grooves including a second width which is narrower than the first width.

Preferably, the tread pattern comprises a block row across the first pitch pattern and the second pitch pattern, the block row enclosing the center block and one of the two side block alignments of the first pitch pattern, and a starting block of one of the two side block alignments of the second pitch pattern, said starting block being off-centred with respect to said side block alignment of said one of the two side block alignments of the first pitch pattern.

In an embodiment, the tread pattern comprises a third pitch pattern, said third pitch pattern including a center block crossed by the midplane, two side block alignments, said side block alignments being inclined with respect to one another and extending from the center block; and a third pitch length which is shorter than the second pitch length, and a third number of blocks which is greater than the second number of blocks.

In an embodiment, the first pitch pattern includes first edge bodies with a first body length, the blocks of the first pitch pattern being arranged between the first edge bodies; and the second pitch pattern includes second edge bodies with a second body length which is shorter than the first body length, the blocks of the second pitch pattern being arranged between the second edge bodies.

In an embodiment, the tread pattern comprises a straight groove and a crenelled groove which comprise depth variations, which extend on a whole axial width of the tread pattern, and which are parallel.

In an embodiment, the two side block alignments of the first pitch pattern each comprise a first side width, and the two side block alignments of the second pitch pattern each comprise a second side width which is longer than the first side width.

In an embodiment, each side block alignment comprises an axially outboard block, the tread pattern comprising a bridge connecting one of the axially outboard blocks of the first pitch pattern to one of the axially outboard blocks of the second pitch pattern.

In an embodiment, within the second pitch pattern, the blocks are separated by second grooves and third grooves, the second grooves being between the third grooves and being wider than the third grooves.

In an embodiment, each side block alignment comprises at least two adjacent blocks aligned on the corresponding center block.

In an embodiment, the blocks of the first pitch pattern are arranged in a chevron pattern.

In an embodiment, the blocks of the second pitch pattern are arranged in a chevron pattern.

In an embodiment, the side block alignments are inclined with respect to the rotation axis of an angle ranging from 40° to 50°.

In an embodiment, at least one of the two side block alignments of the first pitch pattern is parallel to at least one of the two side block alignments of the second pitch pattern.

In an embodiment, the tread pattern comprises bridges connecting end blocks of the first pitch pattern and end blocks of the second pitch pattern.

In an embodiment, the side block alignments are symmetrical.

In an embodiment, a difference between the second number and the first number is at least 2, and/or ranges from 2 to 10; preferably from 2 to 6 or from 2 to 4. For example, the first number is five and the second number is seven.

In an embodiment, the first number is at least 3, preferably at least 5.

In an embodiment, the side block alignments are inclined to the rotation axis of an angle ranging from 30° to 60°.

In an embodiment, the tread pattern comprises bridges connecting end blocks of the second pitch pattern and edge bodies of the first pitch pattern.

In an embodiment, the side block alignments of the second pitch pattern are longer than the side block alignment of the first pitch pattern.

In an embodiment, the pneumatic tire comprises a shore harness ranging from 55 to 65; preferably from 57 to 63.

Definitions

"Carcass" means the tire structure apart from the belt structure, tread, undertread, and sidewall rubber over the plies, but including the beads.

"Equatorial plane (EP)" means the plane perpendicular to the tire's axis of rotation and passing through the center of its tread.

"Groove" means an elongated void area in a tread that may extend circumferentially or laterally about the tread in a straight, curved, or zig-zag manner. Circumferentially and laterally extending grooves sometimes have common portions and may be subclassified as "wide", "narrow", or "slot". In the appended drawings, slots are illustrated by single lines because they are so narrow. Grooves generally remain open in a tie footprint.

"Net-to-gross" refers to the ratio of the ground contacting surface of a tread to the total tread area.

"Pitch" refers to the distance from one peak in the tread pattern to the next.

"Pitch boundary" refers to substantially lateral line in the circumference of the tire that define beginning or end of the pitch. The pitch boundary may be defined by the center of a lateral groove. A pitch boundary "shift" refers to a circumferential displacement of the line.

"Pitch Tone" refers to a potentially objectionable sound in which the sound energy is concentrated into a narrow frequency band and is perceived essentially as a single frequency that clearly stands out from the surrounding background noise.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Non-pneumatic tire" means a mechanical device of generally annular shape having a tread and made of rubber, chemicals, fabric and steel or other materials. The mechanical device further comprises an annular structure inside the tread, which is adapted to be mounted on a wheel rim in order to sustains the vehicle load. When mounted on the wheel of a motor vehicle, the non-pneumatic tire through its tread provides traction.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which.

DETAILED DESCRIPTION OF THE INVENTION

For the disclosure, the following definitions are given.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g., 1 to 5 includes 1, 2, 3, 4 when referring to, for example, a number of elements, and can also include 1.5, 2, 2.75 and 3.80, when referring to, for example, measurements). The recitation of endpoints also includes the recited endpoint values themselves (e.g., from 1.0 to 5.0 includes both 1.0 and 5.0). Any numerical range recited herein is intended to include all sub-ranges subsumed therein.

The reference throughout this specification to "one embodiment" or "an embodiment" means that a particular feature, structure or characteristic described in connection with the embodiment is included in at least one embodiment of the present invention. The particular features, structures, characteristics or embodiments may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention and form different embodiments, as would be understood by those in the art.

Unless otherwise defined, all terms used in disclosing the invention, including technical and scientific terms, have the meaning as commonly understood by one skilled in the art to which this invention belongs. By means of further guidance, definitions for the terms used in the description are included to better appreciate the teaching of the present invention.

The following is an explanation of a pneumatic or non-pneumatic tire according to the invention.

Figure 1:
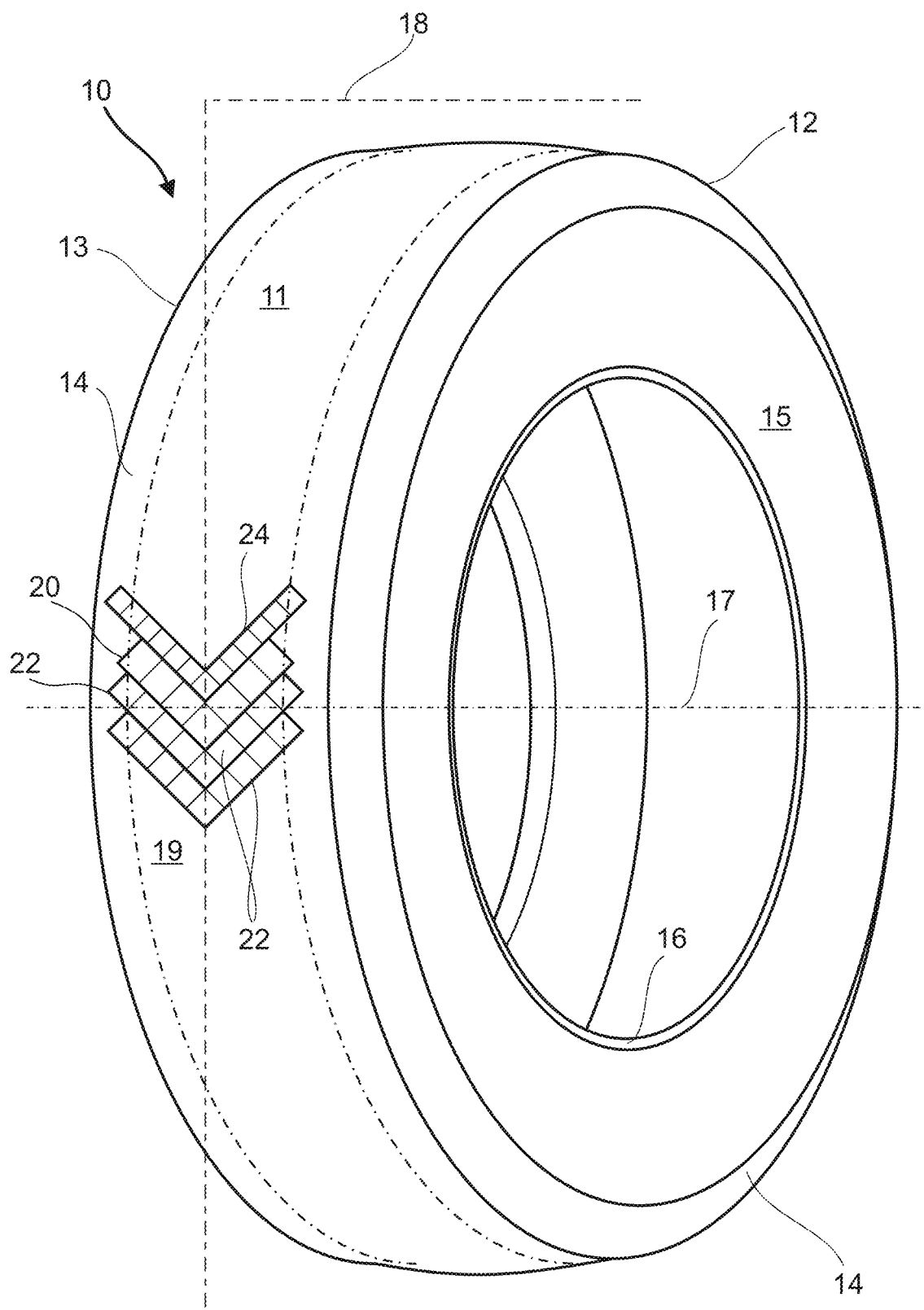
FIG. 1 is a perspective view of a pneumatic tire in accordance with the present invention.

Reference is made to FIG. 1 provides a perspective view of a pneumatic tire according to the invention. The tire 10 is adapted for a passenger car. It could be used for a commercial vehicle. Tire 10 illustrated in FIG. 1 is a pneumatic tire and exhibits a radial carcass construction, but the invention is not limited to a pneumatic tire and the person skilled in the art will adapt the invention to a non-pneumatic tire without any difficulty. The tire 10 comprises a ground contacting tread portion 11 having a pair of lateral edges 12 and 13 which are each flanked by a shoulder region 14. Each shoulder region 14 extends radially inwardly into a sidewall 15, and each sidewall 15 terminates at its radially inner end in a bead portion 16 utilized for fitting the tire onto a wheel rim.

The tire 10 further exhibits a rotation axis 17 through the tread portion 11. The pneumatic tire 10 is balanced to rotate about the rotation axis 17. The pneumatic tire 10 exhibits a midplane 18. It may correspond to an Equatorial plane. The midplane 18 is perpendicular to the rotation axis 17. The midplane 18 is in the middle between the lateral edges 12 and 13. The midplane 18 is a geometric plane.

The tread portion 11 is a circumferential tread portion 19 around the rotation axis 17. The circumferential tread portion 19 comprises a plurality of pitch patterns. The pitch patterns comprise different lengths, notably different circumferential lengths. In the current illustration, the plurality of pitch patterns exhibits at least: a first pitch pattern 20, a second pitch pattern 22 and a third pitch pattern 24. In the current illustration, only four pitch patterns are represented. However, it is encompassed in the current invention to repeat the pitch patterns all around the tread portion 11.

As an option, the second pitch pattern 22 is repeated. Two second pitch patterns 22 are adjacent. They may form pitch clusters. As a further option, at least three second pitch patterns 22 are adjacent. The same may be applied to the first pitch pattern 20 and the third pitch pattern 24. Several pitch clusters of identical pitch patterns are arranged along the circumference of the tread portion 11. The clusters are distributed at irregular angular positions about the rotation axis 17. This aspect reduces tire noise.

As an option, the first pitch pattern 20, the second pitch pattern 22 and the third pitch pattern 24 have different widths. This feature promotes a silicious ride since it has an impact on the noise frequency spectrum. The tire 10 comprises a shore harness ranging from 55 to 65; preferably from 57 to 63. The shore hardness may be measured in accordance with the norm ISO 7619-1:2010.

Figure 2:
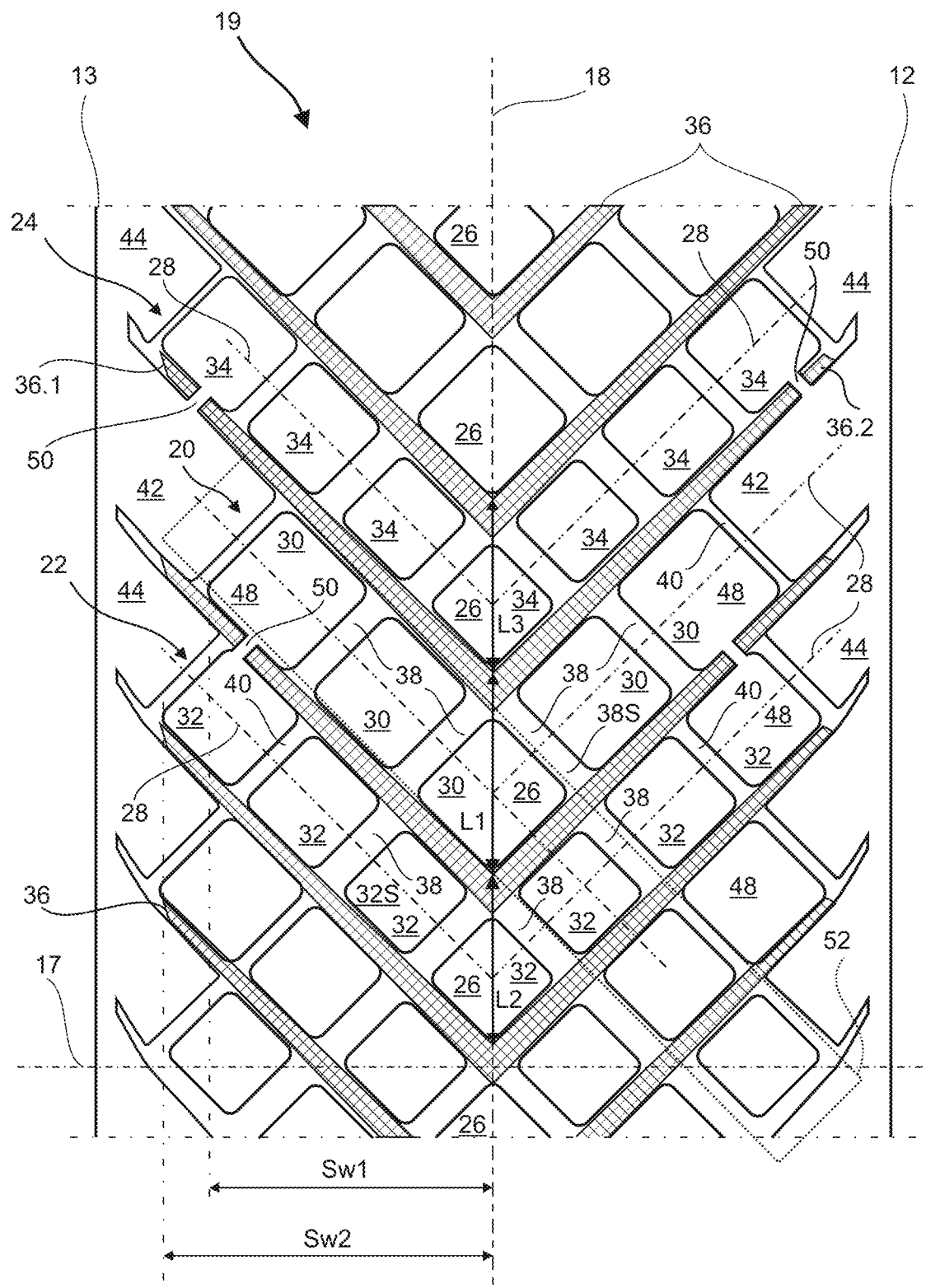
FIG. 2 is a plan view of a circumferential tread portion of a tire in accordance with the present invention.

FIG. 2 is a plan view of an angular segment of a circumferential tread portion 19 of a tire. The tire may correspond to the pneumatic tire described with FIG. 1.

The circumferential tread portion 19 forms a tread pattern. The tread pattern exhibits at least a first pitch pattern 20 and a second pitch pattern 22. Optionally, the tread pattern further encloses a third pitch pattern 24 and a fourth pitch pattern (not illustrated). Each pitch pattern comprises a center block 26 crossed by the midplane 18, and two side block alignments 28. The side block alignments 28 are inclined with respect to one another and extend from the center block 26. The side block alignments 28 are inclined with respect to the rotation axis 17 and the midplane 18. Each side block alignment 28 comprises at least two aligned blocks adjacent to the corresponding center block 26. The side block alignments 28 are inclined with respect to the rotation axis 17 of an angle ranging from 40° to 50°. In the present disclosure, the wording "block" is a synonym of "tread block". The block is a protrusion providing a surface intender to engage the road.

The first pitch pattern 20 includes a first pitch length L1 and a first number of blocks. In the current illustration, the first pitch pattern 20 comprises five blocks. More generally, the first number may range from three to ten. As an option, the blocks of the first pitch pattern 20 are identical; or at least of the same shape. They may be the first blocks.

It is understood in the current invention that the expression "identical blocks" is not to be understood in a strict meaning. This expression also covers blocks with a size variation of at most 10% with respect to an average size of the corresponding pitch pattern.

The second pitch pattern 22 comprises a second pitch length L2 which is shorter than the first pitch length L1. In addition, the second pitch pattern 22 comprises a second number of blocks which is greater than the first number of blocks. The second number may range from five to fifteen. The blocks of the second pitch pattern 22 may be second blocks 32. The second block 32 may be identical, or similar. They may have the same shape; for instance, the shape of the first blocks 30.

The third pitch pattern 24 includes a center block 26 crossed by the midplane 18; and two side block alignments 28 which are inclined with respect to one another and which extend from the center block. The third pitch pattern 24 further exhibits a third pitch length L3 which is shorter than the first pitch length L1. The third pitch length L3 may be closer to the second pitch length L2 than to the first pitch length L1.

The features defined in connection with the lengths L1, L2 and L3 may apply to the widths of the blocks of the pitch patterns (20; 22; 24). The widths are measured along the rotation axis 17.

The blocks of the third pitch pattern 24 are third blocks 34. The third blocks 34 may be similar or identical. The third blocks 34 may have the same shape. They may have the same shape as the first blocks 30; but at another size. The third pitch pattern 24 includes a third number of blocks which is greater than the first number of blocks and/or the second number of blocks. The third number of blocks may be equal to the second number of blocks. The second number can be seven.

The blocks may generally have quadrilateral shapes with the main axis parallel to the rotation axis 17. This feature increases the stiffness of the blocks along the rotation axis 17. It improves the stability of the tire.

As an option, the first blocks 30 have a first square shape, with a diagonal parallel to the rotation axis 17. The other diagonal is along the circumferential direction; thus, parallel to the midplane 18. The second blocks 32 have a second square shape which is smaller than the first square shape. The second square shape includes parallel, yet smaller, sides and diagonals than the first square shape. Accordingly, the first pitch pattern 20 includes a first pitch width along the rotation axis 17; and the second pitch pattern includes a second pitch width which is shorter than the first pitch width.

As an option or an alternative, the first blocks 30 have a different shape than the second blocks 32. The first blocks 30 the blocks of the first pitch pattern are arranged in a chevron pattern. For illustrative purposes, the first blocks may be circular or trapezoidal and the second blocks 32 are diamond-shaped. As a further option, the third blocs 34 are rectangles or triangles. Other combinations of shapes are encompassed by the present invention.

One of the two side block alignments 28 of the first pitch pattern 20 is parallel to one of the two side block alignments 26 of the second pitch pattern 22. More generally, the side block alignments 28 on the left side of the tire are parallel; and/or the side block alignments 28 on the right side of the tire are parallel. The left side and the right side correspond to the lateral edges 13 and 12 respectively.

The first pitch pattern 20 and the second pitch pattern 20 are circumferentially separated by a first groove 36. Another first groove may form a separation between the first pitch pattern 20 and the third pitch pattern 24. The first groove 36 exhibits a first depth, preferably a first constant depth. The first groove 36 may exhibit a "V" shape; or a chevron shape. The first grooves 36 are distributed around the circumferential tread portion 19. The first grooves 36 are adapted for evacuating water on the road when the associated vehicle is circulating in wet conditions. The first grooves 36 are also designated as pitch separating grooves, or inter pitch channels. The first grooves 36 form the pitch boundaries.

Within the first pitch pattern 20, the first blocks 30 are separated by second grooves 38. The second grooves 38 are shorter than the first groove 36. The first grooves 36 are wider and deeper than the second grooves 38. The depths of the grooves are measured perpendicularly to the rotation axis 17. The widths of the second grooves 38 are measured along the side block alignments 28. The second grooves 38 show a second depth which is shallower than the first constant depth of the first groove 36. The second grooves 38 may be block separating grooves. Due to the groove arrangement, the circumferential tread portion 19 comprises a net-to-gross ranging from 50% to 85%; preferably from 60% to 75%, more preferably from 64% to 72%.

The first groove 36 comprises a first section 36.1 and a second section 36.2 which is inclined with respect to the first section 36.1. The first section 36.1 and the second section 36.2 are inclined with respect to the rotation axis 17, and symmetrical. A starting second groove 38S, is aligned on the first section 36.1. These groove sections are communicating. Then, it eases a fluid flow between the road and the circumferential tread portion 19.

Within the second pitch pattern 22, the second blocks 32 are separated as well by second grooves 38. They may also be separated by third grooves 40. The second grooves are between the third grooves 40. The second grooves 38 are wider than the third grooves 40. This aspect eases the water evacuation from the axial center of the circumferential tread portion 19.

Generally, the tread pattern comprises a straight groove and a crenelled groove which comprise depth variations, which extend on a whole axial width of the tread pattern, and which are parallel. The crenelled groove extends from one lateral edge 13 to the opposite lateral edge 12. The straight groove is formed where several second and third grooves are aligned on one of the first sections 36.1 or one of the second sections 36.2. The crenelled groove is formed in one of the sections (36.1; 36.2), several second grooves 38 and third grooves which are continuous but slightly offset. Then the tread pattern provides different offset blocks while allowing straight grooves to foster water discharge.

The first pitch pattern 20 includes first edge bodies 42 with a first body length. The first body length may be measured along the side block alignments 28. The first blocks 30 are arranged between the first edge bodies 42. The second pitch pattern 22 includes second edge bodies 44 with a second body length which is shorter than the first body length. The second blocks 32 of the second pitch pattern are aligned in two branches between the second edge bodies 44. The circumferential tread portion 19 may further comprise second edge bodies 44 at the ends of the third pitch pattern 24. The combination of the first edge bodies 42 and the second edge bodies 44 may form two ribs.

The two side block alignments 28 of the first pitch pattern 20 each comprise a first side width Sw1 which is measured along the rotation axis 17. The two side block alignments 28 of the second pitch pattern 22 each comprise a second side width Sw2 which is longer than the first side width Sw1. This width difference reduces the tire noise.

Each side block alignment 28 comprises an axially outboard block 48. The tread pattern comprises at least one bridge 50 connecting one of the axially outboard blocks 48 of the first pitch pattern 20 to one of the axially outboard blocks 48 of the second pitch pattern 22. This improves the stiffness of the circumferential tread portion 19. The bridge 50 may be at one end of the associated first groove 36, or across the first groove 36. As an option, a bridge 50 connects one of the outboard blocks 48 to one of the first edge bodies 42.

The tread pattern comprises at least one block row 52 across the first pitch pattern 20, at least one second pitch pattern 22; and optionally one of the third pitch pattern 24. The block row 52 encloses an alignment of first blocks 30, at least one second block 32; and optionally a third block. The block row 52 encloses the center block 26 and a one of the two side block alignments 28 of the first pitch pattern 20, and a starting block 32S of one of the two side block alignments 28 of the second pitch pattern, said starting block being off centered with respect to said side block alignment of said one of the two side block alignments of the first pitch pattern.

The circumferential tread portion 19 provides a matrix of generally aligned blocks, wherein several second grooves and blocks are at irregular positions in the matrix due to different block sizes. The first groove, the second groove, and optionally the third groove, define a groove network adapted to the pitch size variation, resulting from circumferential lengths differences, and/or block number variations.

Figure 3:
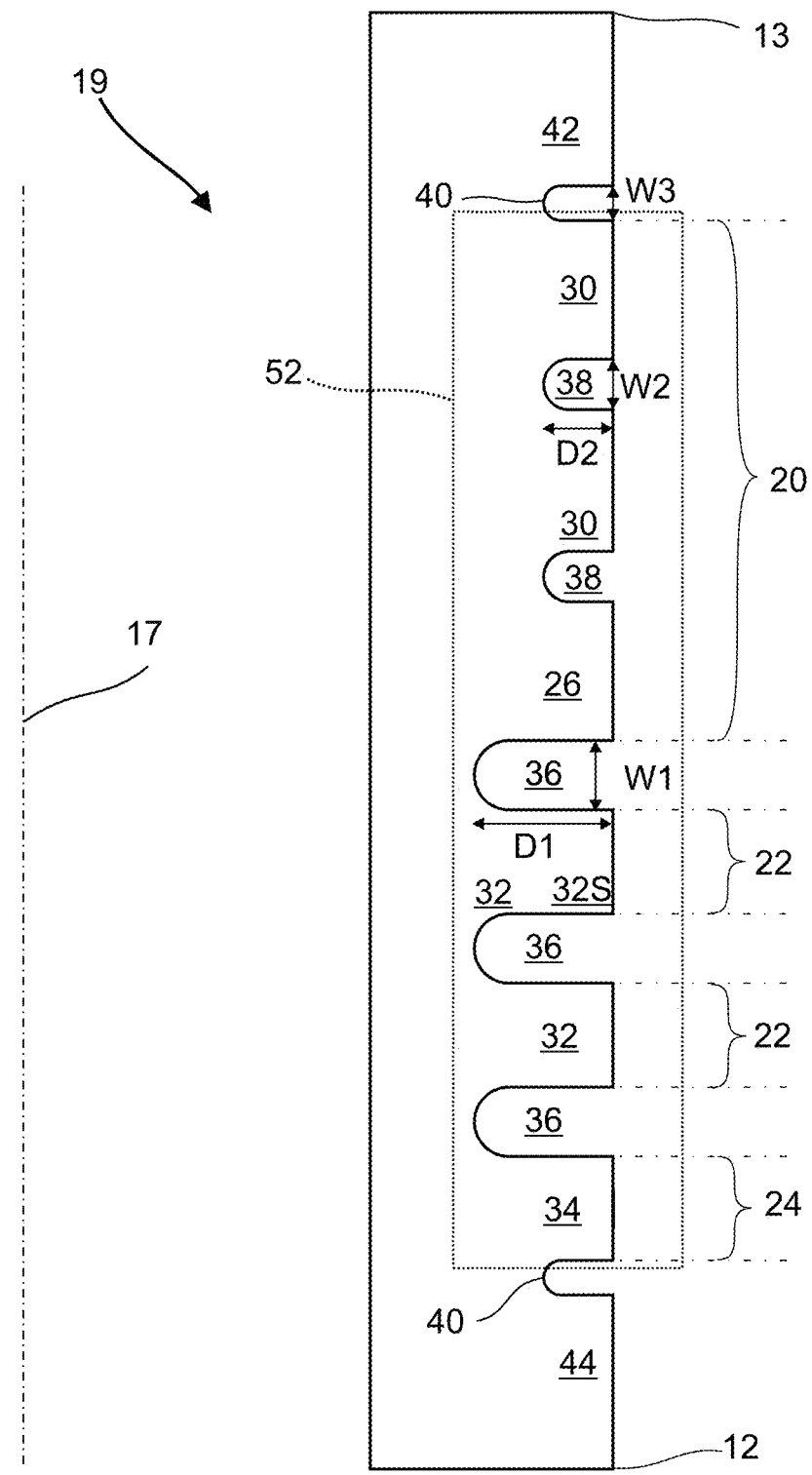
FIG. 3 is a through cut of a circumferential tread portion of a tire in accordance with the present invention.

FIG. 3 provides a through cut of the circumferential tread portion 19 along the blocks gathered in the block row 52. The position of the rotation axis it provided for orientation purposes.

The first pitch pattern 20 and the second pitch pattern 22 are circumferentially separated by the first groove 36 which includes a first width W1 and a firth depth D1. Still, within the first pitch pattern 22, the blocks are separated by second grooves 38 including a second width W2 which is narrower than the first width W1. The third width W3 of the third groove 40 may be narrower than the second width W1. However, they may be of the same depth.

In the current illustration, the block row 52 is marked by a first edge body 42 and a second edge body 44. The block row 52 crosses three first grooves 36 which separate two second pitch patterns 22, and also delimit these second pitch patterns 22 from a first pitch pattern 20 and a third pitch pattern 24. Two second grooves 38 and one third groove 40 are apparent. They form recesses between the blocks. The second grooves 38 and the third grooves 40 define channels between the first blocks 30 and the center block 26. The center block 26 is adjacent to the starting block 32S. The specific shape of the circumferential tread portion 19 provides different pitch tones instead of one. Then, the perceived tire noise is limited.

Figure 4:
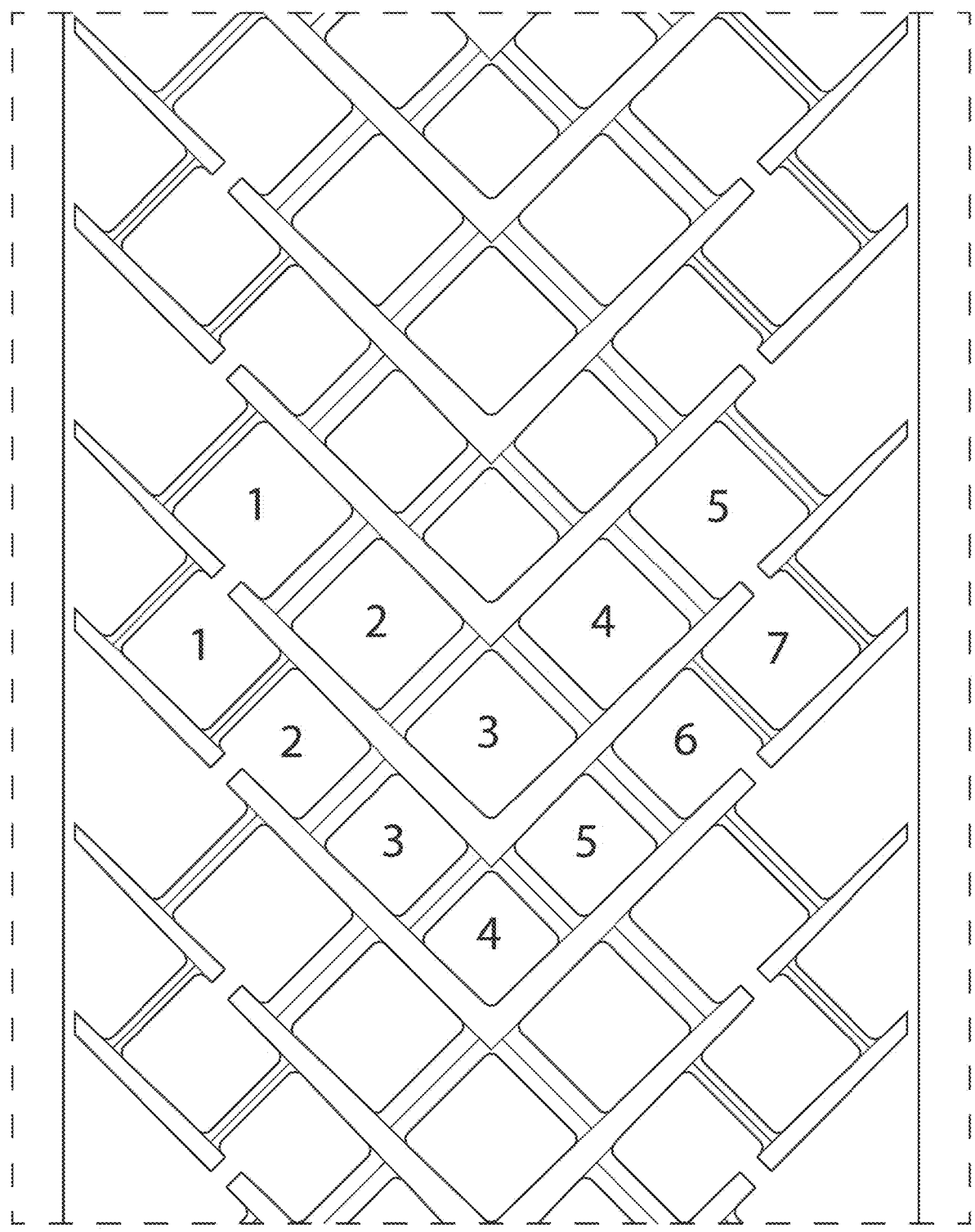
FIG. 4 is a new tread design incorporating square blocks which are keeping their shape independently from pitch size. To achieve this, instead of the traditional pitch scaling which would result in a composition of rectangular blocks, the amount of square blocks inside one pitch vary depending from the pitch size. A large pitch ratio would incorporate 5 square blocks laterally arranged in a V-Shape whereas a medium and small pitch ratio would incorporate 7 square blocks laterally arranged in a V-Shape. Other shapes could be used.

FIG. 4 illustrates a new tread design incorporating square blocks which are keeping their shape independently from pitch size. To achieve this, instead of the traditional pitch scaling which would result in a composition of rectangular blocks, the amount of square blocks inside one pitch vary depending from the pitch size. A large pitch ratio would incorporate 5 square blocks laterally arranged in a V-Shape whereas a medium and small pitch ratio would incorporate 7 square blocks laterally arranged in a V-Shape. Other shapes could be used, such as rectangles or circles.

Figure 5:
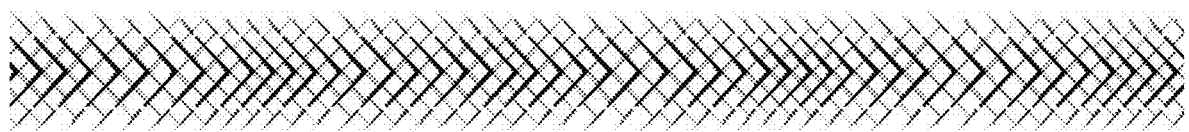
FIG. 5 is the complete tread pattern from 0 to 360 degrees that is projected on a flat surface.

FIG. 5 is the complete tread pattern of FIG. 4 from 0 to 360 degrees that is projected on a flat surface.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire for a vehicle, the tire comprising:
a circumferential tread portion comprising a tread pattern exhibiting at least a first pitch pattern and a second pitch pattern, each comprising:
a center block located on the midplane and having a square shape, and
two side blocks having a square shape, and wherein the two side blocks and the center block are arranged in a V shaped pattern;
the first pitch pattern including a first pitch length and a first number of blocks;
the second pitch pattern including a second pitch length which is less than the first pitch length, and a second number of blocks which is greater than the first number of blocks, and wherein the first pitch pattern and the second pitch pattern are separated by a V shaped groove.

2. The tire of claim 1, wherein the blocks have a diagonal parallel to a rotational axis of the tire.

3. The tire of claim 1, wherein the blocks of the first pitch pattern have a first width, and the blocks of the second pitch pattern have a second width, wherein the second width is less than the first width.

4. The tire of claim 1, wherein the first pitch pattern and the second pitch pattern are circumferentially separated by a first groove including a first constant depth, and within the first pitch pattern the blocks are separated by second grooves including a second depth which is shallower than the first constant depth.

5. The tire of claim 4, wherein the first groove comprises a first section and a second section which is inclined with respect to the first section, at least one of the second grooves being aligned on the first section.

6. The tire of claim 1, wherein the first pitch pattern and the second pitch pattern are circumferentially separated by a first groove including a first width, and within the first pitch pattern, the blocks are separated by second grooves including a second width which is narrower than the first width.

7. The tire of claim 1, wherein the tread pattern comprises a block row across the first pitch pattern and the second pitch pattern, the block row enclosing the center block and a side block alignment of the first pitch pattern and a starting block of a side block alignment of the second pitch pattern, said starting block being off-centered with respect to said side block alignment of said side block alignment of the first pitch pattern.

8. The tire of claim 1, wherein the tread pattern comprises a third pitch pattern, said third pitch pattern including a center block crossed by the midplane, and two side block alignments which are inclined with respect to one another and extending from said center block; and a third pitch length which is shorter than the second pitch length, and a third number of blocks which is greater than the second number of blocks.

* * * * *